June 12, 1945.  W. A. LIPPINCOTT  2,377,892
BAG MOLDING APPARATUS
Filed Oct. 27, 1943
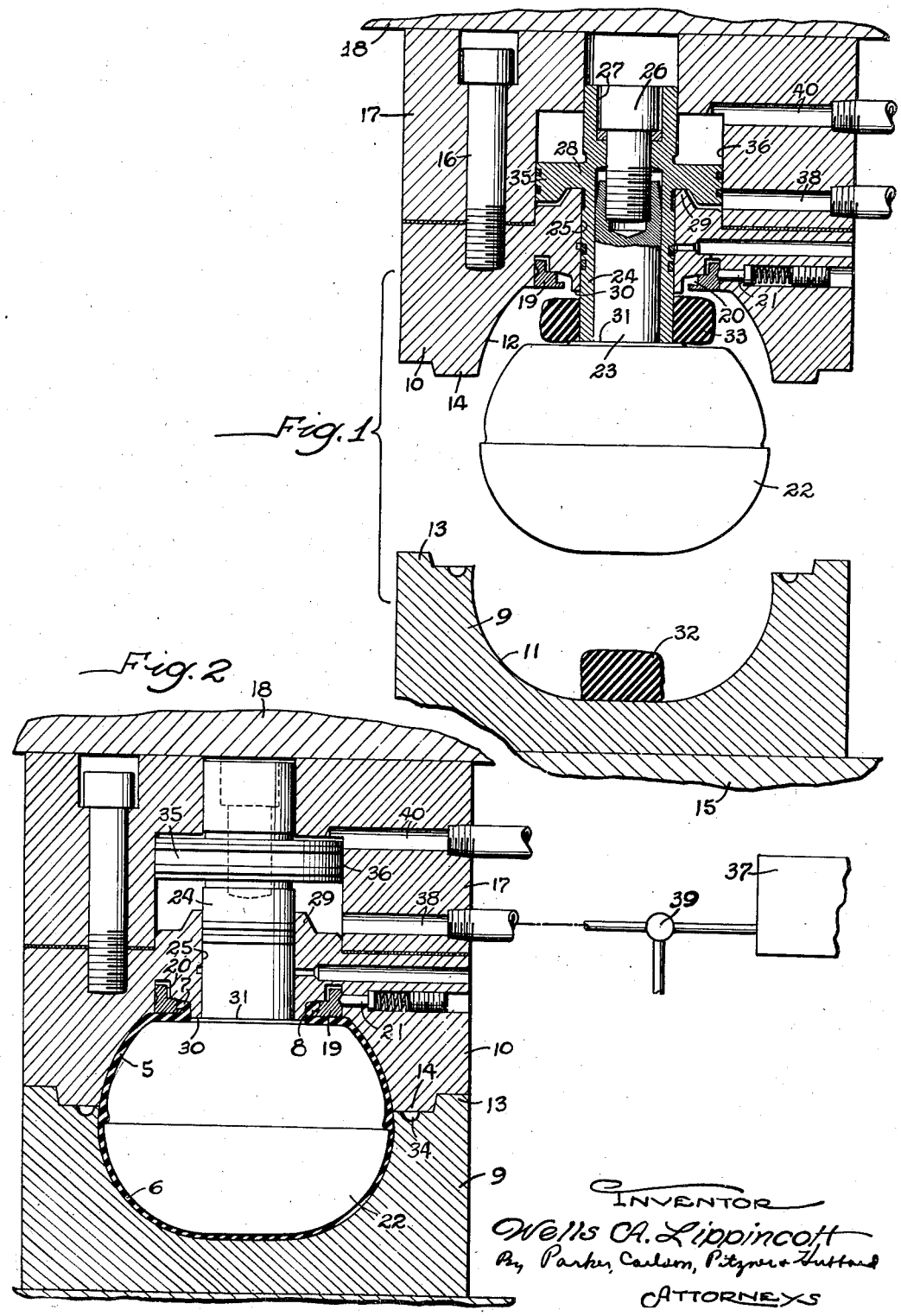
INVENTOR
Wells A. Lippincott
By Parker, Carlson, Pitzner & Hubbard
ATTORNEYS Patented June 12, 1945

2,377,892

UNITED STATES PATENT OFFICE 2,377,892

BAG MOLDING APPARATUS

Wells A. Lippincott, Evanston, Ill., assignor to Ideal Roller & Manufacturing Company, Chicago, Ill., a corporation of Illinois Application October 27, 1943, Serial No. 507,808

2 Claims. (Cl. 18—42)

This invention relates to apparatus for molding open neck bags of rubber or like material. More particularly, the invention relates to molding apparatus in which the interior of the bag is defined by the external surface of a mandrel, and the external surface is formed by two separable parts collapsed around the mandrel.

The primary object of the invention is to provide molding apparatus of the above character by which the intended shape of the bag may be achieved even through different parts of the bag are composed of materials having different flow characteristics in the plastic state.

The invention also resides in the novel structural character of the means for carrying out the foregoing.

Other objects and advantages of the invention will become apparent from the following detailed description taken in connection with the accompanying drawing, in which Figures 1 and 2 are fragmentary diametrical cross-sectional views of a mold set-up embodying the present invention, the mold being open and closed respectively.

While the invention is susceptible of various modifications and alternative constructions, I have shown in the drawing and will herein describe in detail the preferred embodiment. It is to be understood, however, that I do not intend to limit the invention by such disclosure, but aim to cover all modifications and alternative constructions falling within the spirit and scope of the invention as expressed in the appended claims.

In the drawing, the invention is embodied in an apparatus for molding a bag of the type commonly used in hydraulic accumulators comprising two cups 5 and 6 joined at their open ends and having an annular flange 7 formed around the neck 8 of the bag. The cups may be of different wall thickness, and, in this instance, the cup 5 is composed of rubber material which, in the plastic state and at the molding temperature, is less flowable than the material of which the cup 6 is formed.

The mold proper comprises two parts 9 and 10 having semi-spherical cavities 11 and 12 which, by virtue of interfitting projections 13 and 14, register accurately when the mold is closed as shown in Fig. 2. Herein, the part 9 is supported on the lower platen 15 of a suitable press. The upper part 10 is connected as by screws 16 to a block 17 which is engaged by the upper platen 18. Heating of the mold parts may be by conduction from the press platens. The external shape of the bag neck and the adjacent end of the cup 5 is defined by a ring 19 disposed in a groove 20 at the bottom of the cavity 12 and held removably in place by a spring detent 21.

The internal surface of the bag is contoured according to the exterior of a mandrel 22 which is removably mounted on the mold part 10 and is slidable relative thereto axially of the cavity 12. In this instance, the mandrel is rigid with a stem 23 which fits into a sleeve 24 slidable in a bore 25 of the mold part 10 and the block 17. A screw 26 threads into the end of the stem with its head seated in a socket 27 in the upper end of the sleeve. The sleeve and stem are thus connected rigidly, but, after withdrawal of the screw, the mandrel may be separated from the part 10 to permit removal of the finished bag from the mandrel. In the loading position (Fig. 1) a flange 28 rigid with the sleeve 24 rests on a ledge 29 of the mold part 10 thereby supporting the mandrel within the separated mold cavities.

Final positioning of the mandrel in the two cavities 11 and 12 as the mold is closed is effected by a stop formed in the present instance by an annular shoulder 30 on the part 10 immediately adjacent the sleeve 24. The stop surface is engaged by a raised surface 31 on the top of the mandrel. When the stop is thus engaged, the exterior of the mandrel will be spaced accurately from the wall of the cavity 12 thereby determining the wall thickness of the cup 5 and the neck flange 7.

Separate bodies 32 and 33 of the rubber materials for forming the two bag parts are placed in the cavities 11 and 12 as shown in Fig. 1. The body 33 is a ring encircling the lower end of the sleeve 24 adjacent the mandrel. With the mold thus loaded, the platens are moved together gradually to form the bag. In this operation, both compounds soften and flow around the cavities filling the spaces between the exterior of the mandrel and the interior of the parts 10 and 11, the excess flowing into a flash cavity 34.

When, as herein contemplated, the cup 5 is made of material which is less flowable than the material of the cup at the molding temperature, this material will offer greater resistance to the motion of the mandrel 22 relative to the mold part 10 than the body 32 offers to the advance of the mandrel with the result that too much of the more plastic compound is squeezed out between the upper and lower decks of the mold before the latter becomes fully closed. To avoid this condition, the invention contemplates the provision of power actuated means operable independently of the platen motions to overcome the greater resistance offered by the plastic body 33 and move the mandrel into the cavity 12 so as to bring it against the stop 30 and effect proper distribution of the two materials in the plastic state. Herein, this means is actuated by fluid pressure and comprises a piston 35 formed by the flange 28 on the sleeve 24 and slidable in a cylinder 36 which is formed by counter-boring the mold part 17. Pressure fluid such as compressed air from a suitable source 37 may be admitted to the cylinder beneath the piston through a passage 38, sufficient pressure being thus applied to offset the difference in the resistances offered by the bodies 32 and 33 to the mandrel motion. The flow of pressure fluid may be controlled manually by a hand valve 39 or automatically, if desired, in response to the movement of the platen 18 in the closing of the mold. The other end of the cylinder is vented through a passage 40.

In the molding operation, the power actuator operates in the following manner. After loading of the mold as shown in Fig. 1, pressure fluid is admitted to the cylinder 36 to raise the mandrel, and the platen 18 is lowered. Under this added upward force, the mandrel moves into the cavity 12 and comes against the stop 30 before its lower portion reaches its final position (Fig. 2) in the lower cavity 11. As a result, accurate positioning of the mandrel within the mold is assured and the two rubber materials are distributed properly in spite of their different flow characteristics.

The air pressure may be released as soon as the mold is closed. If desired, air may, after withdrawal of the screw 26, be admitted above the piston 35 through the passage 40 to facilitate lowering of the mandrel.

I claim as my invention:

1. Apparatus for molding a bag or the like having an opening at the top and upper and lower portions made of materials having different flow characteristics during molding and comprising, in combination, upper and lower mold parts adapted respectively to shape the outer surfaces of said upper and lower bag portions of different materials, means supporting said upper and lower mold parts for relative movement in a straight line toward each other and into engagement to form a cavity corresponding in shape to the external contour of the bag, a mandrel having external contours adapted to form the internal surface of the bag and define the opening in the top of the bag, a shaft projecting rigidly from that portion of the mandrel which defines said bag opening, said shaft being slidable endwise in the upper mold part and along said straight line to carry the mandrel toward and from said upper mold part, a stop for limiting movement of the mandrel toward the upper mold part to provide proper spacing between the mandrel and upper mold part, and power operated means on said shaft for moving the mandrel relative to said upper mold part to a position against said stop and for holding such position prior to the closing of the upper and lower mold parts.

2. Apparatus for molding a bag or the like having an opening at the top and comprising, in combination, upper and lower mold parts adapted to shape the outer surfaces of the bag, means supporting said upper and lower mold parts for movement toward each other in a straight line and into engagement to form a cavity corresponding in shape to the external contour of the bag, a mandrel having external contours adapted to form the internal surface of the bag and define the opening in the top of the bag, a shaft extending from the mandrel at the opening forming portion thereof and supported for endwise movement in said straight line to carry the mandrel toward and away from said upper mold part, means on said upper mold part defining a fluid cylinder, a piston slidable in said cylinder and connected to said shaft for moving said shaft and mandrel under fluid pressure applied to said cylinder, and a stop for limiting movement of the mandrel toward the upper mold part and to provide proper spacing between the mandrel and upper mold part, said upper and lower mold parts having faces adapted to seat together after the movement of the mandrel into proper position with respect to the upper mold part for closing and completing the mold.

WELLS A. LIPPINCOTT.